United States Patent [19]
Watanabe

[11] Patent Number: 5,644,403
[45] Date of Patent: Jul. 1, 1997

[54] COLOR IMAGE PROCESSING METHOD AND APPARATUS HAVING SINGLE SIDE AND TWO SIDE MODES FOR PROCESSING COLOR IMAGE DATA

[75] Inventor: Nobuyuki Watanabe, Yokohama, Japan

[73] Assignee: Canon Kabushiki Kaisha, Tokyo, Japan

[21] Appl. No.: 663,817

[22] Filed: Jun. 14, 1996

Related U.S. Application Data

[62] Division of Ser. No. 68,098, May 28, 1993, Pat. No. 5,557,428.

[30] Foreign Application Priority Data

May 29, 1992 [JP] Japan ................... 4-138443

[51] Int. Cl.$^6$ .............. H04N 1/23; H04N 1/46; H04N 1/60; G03G 21/00
[52] U.S. Cl. ............ 358/296; 358/501; 358/518; 358/530; 399/45; 399/85; 399/364
[58] Field of Search ................ 358/296, 300, 358/401, 498, 501, 504, 518–521, 530; 347/3, 5, 14, 172, 232; 382/162, 167; 399/39, 45, 85, 184, 364, 374

[56] References Cited

U.S. PATENT DOCUMENTS

| | | | |
|---|---|---|---|
| 4,541,705 | 9/1985 | Knechtel | 355/319 |
| 4,847,638 | 7/1989 | Moriyama | 347/14 |
| 5,012,333 | 4/1991 | Lee et al. | 358/520 |
| 5,132,739 | 7/1992 | Mauer et al. | 355/319 |
| 5,247,336 | 9/1993 | Mills, III | 355/319 |
| 5,281,998 | 1/1994 | Douglas et al. | 358/296 X |
| 5,319,464 | 6/1994 | Douglas et al. | 358/296 |

*Primary Examiner*—Eric Frahn
*Attorney, Agent, or Firm*—Fitzpatrick, Cella, Harper & Scinto

[57] ABSTRACT

A color image processing apparatus includes a setting device for setting one of a single side mode and a two side mode as an image forming mode and a color processing device for color processing color image data on the basis of the image forming mode set by the setting device to produce color processed color image data. Also included is an output device for outputting the color processed color image data to a color image forming unit.

11 Claims, 10 Drawing Sheets

FIG.10

| SCREEN ANGLE | PATTERN |
|---|---|
| 0° | a — a — a — a — a — a ............ |
| 14° | a — b — c — d — e — f ............ |
| 26° | a — c — e — g — a — c ............ |
| 36° | a — d — g — b — e — h ............ |
| 45° | a — e — a — e — a — e ............ |
| 53° | a — f — c — h — e — b ............ |
| 63° | a — g — e — c — a — g ............ |
| 76° | a — h — g — f — e — d ............ |

COLOR IMAGE PROCESSING METHOD AND APPARATUS HAVING SINGLE SIDE AND TWO SIDE MODES FOR PROCESSING COLOR IMAGE DATA

This application is a division of application Ser. No. 08/068,098 filed May 28, 1993, now, U.S. Pat. No. 5,557,428.

BACKGROUND OF THE INVENTION

1. Field of the Invention

The invention relates to an image forming apparatus and, more particularly, to the hue correction of an image forming apparatus having a full color two-sided printing function.

2. Related Background Art

In recent years, a digital color copying apparatus in which a color image reading apparatus using a CCD or the like and a color image recording apparatus of a laser beam printer (hereinafter, referred to as an LBP), an ink jet printer (hereinafter, referred to as an IJP), or the like are combined has been developed, so that a multicolor original can be read and recorded with a high fidelity including a color tone or the like.

There is, consequently, the demand for such a digital color copying apparatus is increasing every year. A demand to provide various intelligent functions for the digital color copying apparatus is also increasing greatly. One of such functions is a full color two-sided printing function.

The above conventional apparatus, however, has the following problems.

In a color copying apparatus of the electrophotographic type, an electrostatic latent image formed on a photo sensitive drum is developed to a toner image by a developing apparatus and the toner image is copy transferred onto a recording paper by a copy transfer apparatus. After that, the toner image is fixed onto a recording paper by a fixing apparatus. In this case, the fixing apparatus fixes the toner image by twining the crushed particle-like toner and the fibers of the recording paper by using heat energy and pressure.

There is consequently a tendency such that the hue of the color of the lowest layer of the surface (hereinafter, referred to as an A side) of the recording paper onto which an image is first printed is enhanced because the toner is twined to the fibers of the recording paper. In the two-sided recording mode, since fixing energy is applied to the A side even during the fixing operation of the surface (hereinafter, referred to as a B side) of the recording paper onto which the image is printed at the second time, the toner of the color of the lowest layer of the A side is more densely twined with the fibers of the recording paper, so that the hue is further enhanced. On the other hand, upon fixing of the B side onto which the image is printed at the second time, since the fibers of the recording paper have already been crushed when the A side is printed, it becomes difficult to twine the toner of the B side and the fibers of the recording paper and a density of the whole image formed decreases.

As a result, the conventional apparatus has a drawback such that when the two-sided printing operation is executed, the hue of the image printed on the A side is different from the hue of the image printed on the B side.

Similarly, the conventional apparatus has a drawback such that the hue in the case where the same image is printed in the one-side printing mode is different from the hue in the case where the same image is printed in the two-sided printing mode.

For example, in the conventional apparatus, in the case of sequentially recording in accordance with the order of magenta M, cyan C, yellow Y, and black K, upon fixing of the B side, the M toner on the A side is subjected to a fixing energy that is larger than those of the other three colors and the M toner is densely twined with the fibers of the recording paper and a color image is derived. As a result of it, the conventional apparatus has a drawback such that a whole image, printed on the A side is set to a magenta-like color and an image quality is lost.

Such drawbacks occur not only by the fixing as mentioned above but also by a difference between the image forming states between the A side and the B side, a difference of the copy transferring efficiency between the A side and the B side in a color printing apparatus of the electrophotographic type, or the like.

In the above color printing apparatus, the fixing state is different where the recording material is thick from that where the recording material is thin, so that there occurs a problem such that the coloring states of the coloring agents which are developed are different and the hue changes.

Such problems therefore occur not only in the two-sided recording apparatus but also in the case of using recording materials of different thicknesses.

SUMMARY OF THE INVENTION

It is an object of the present invention to provide method and apparatus which can preferably form images on both sides of a recording medium.

Another object of the invention is to provide method and apparatus which can prevent color forming states of color images which are formed on both sides of a recording medium from differing remarkably.

To accomplish the above objects, according to a preferred embodiment of the invention, there is disclosed an image forming apparatus for forming an image onto each of two front and back surfaces of a recording medium, wherein the apparatus comprises processing means for processing image data in accordance with the surface of the recording medium on which the image is formed and forming means for forming the image onto the recording medium on the basis of the image data processed by the processing means, and there is also provided an image forming apparatus for forming an image onto each of two front and back surfaces of a recording medium, wherein the apparatus comprises converting means for converting image data into a dot train signal in accordance with the surface of the recording medium onto which the image is formed and forming means for forming the image onto the recording medium in accordance with the dot train signal generated from the converting means.

Another object of the invention is to provide method and apparatus in an automatic two-sided copying apparatus in which it is possible to prevent that color forming states of color images remarkably differ.

Still another object of the invention is to provide method and apparatus which can preferably perform a color reproduction irrespective of a thickness of recording material.

Further another object of the invention is to provide method and apparatus which can preferably perform a color reproduction even in any case irrespective of the two-sided recording mode and the one-sided recording mode.

The above and other objects and features of the present invention will become apparent from the following detailed description and the appended claims with reference to the accompanying drawings.

BRIEF DESCRIPTION OF THE DRAWINGS

FIG. 10 is a diagram showing an example of a screen angle which is selected by the laser driver of the embodiment.

DETAILED DESCRIPTION OF THE PREFERRED EMBODIMENTS

An embodiment according to the present invention will now be described in detail hereinbelow with reference to the drawings. Although an embodiment in which the invention was applied to a full color copying apparatus of the electrophotographic type will be described hereinbelow, the invention is not limited to such an example. No problem will occur even when the invention is applied to image forming apparatuses such as color printer and copying apparatuses of the other types or the like.

[First embodiment]

Figure 1:
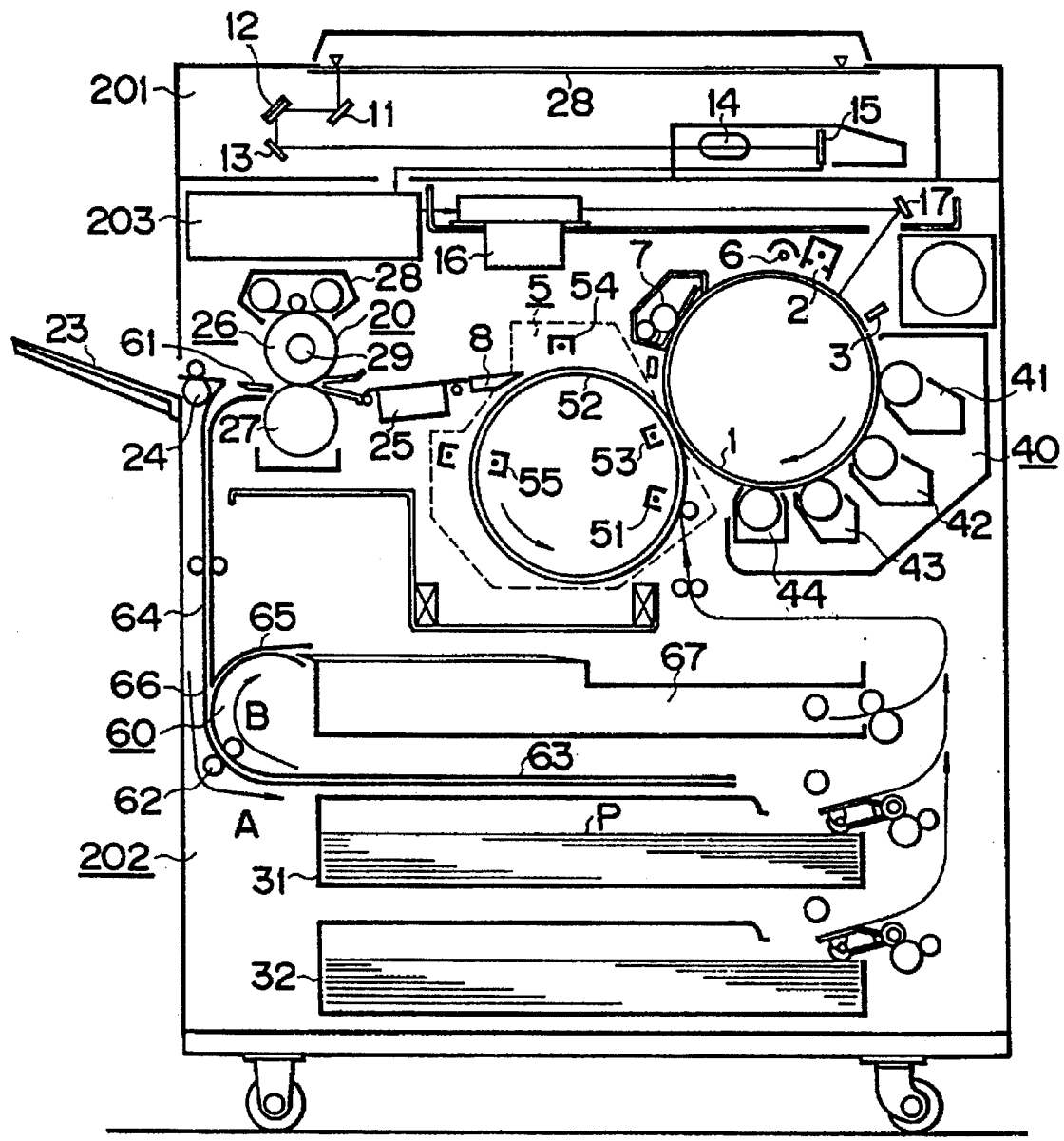
FIG. 1 is a schematic diagram showing an example of a construction of an image forming apparatus of an embodiment according to the present invention.

FIG. 1 is a schematic diagram showing an example of a construction of an image forming apparatus of an embodiment according to the invention. For example, FIG. 1 shows a full color copying apparatus with an automatic two-sided printing function having image forming processes of the electrophotographic type.

In FIG. 1, reference numeral 201 denotes an image scanner unit for reading an original of up to, for instance, A3 size and generates an electric signal according to the read image.

Reference numeral 203 denotes an image processing unit for processing the electric signal generated from the image scanner unit 201 so as to obtain a digital image signal.

Reference numeral 202 denotes a printer unit for obtaining an image corresponding to the original image read by the image scanner unit 201 from the image signal supplied from the image processing unit 203 and generating such an image as a full color image on a recording paper P.

The image scanner unit 201 comprises: first to third scanning mirrors 11 to 13; an image forming lens 14; an image sensor CCD 15 which is formed integrally with three color separation filters of RGB and independently generates three analog signals of three colors of RGB; and an original illuminating lamp 20.

In the image scanner unit 201, the original put on an original supporting glass 28 is illuminated by the lamp 20, the reflected light from the original is led to the image forming lens 14 by the first to third scanning mirrors 11 to 13, and the original image is projected onto the photo sensitive surface of the CCD 15. The original image projected onto the photo sensitive surface of the CCD 15 is separated into images of three colors of red (R), green (G), and blue (B) by the three color separation filters of RGB and converted into electric signals according to intensities of RGB, respectively. The image scanner unit 201 sends the RGB signals generated from the CCD 15 to the image processing unit 203.

The CCD 15 has about 5000 pixels. The image scanner unit 201 scans the whole surface of the original by moving the original illuminating lamp 20 and the first scanning mirror 11 at a speed V in the direction perpendicular to the electrical scanning direction of the CCD 15 and by moving the second and third scanning mirrors 12 and 13 at a speed V/2.

Although the details will be explained later, the image processing unit 203 converts the RGB signals supplied from the image scanner unit 201 into the MCYK signals by digital image signal processes such as logarithm conversion, UCR, masking, gradation correction, etc. and sends the MCYK signals to the printer unit 202.

In the embodiment, the image is area sequentially formed in accordance with the order of MCYK. Therefore, for example, the image scanner unit reads the original image four times. The image processing unit 203 area sequentially generates the image signals. The printer unit 202 area sequentially forms the images. Namely, in the embodiment, one full color image is formed by, for instance, scanning four times.

The printer unit 202 is constructed by a laser scanner unit 16, a photo sensitive drum 1, a developing apparatus 40, a copy transfer drum 5, a fixing unit 20, a two-sided unit 60, and the like.

The laser scanner unit 16 modulates and drives a built-in semiconductor laser in accordance with the image signals supplied from the image processing unit 203. A laser beam emitted from the semiconductor laser scans on the photo sensitive drum 1 through a polygon mirror, a lens, and a fixing mirror 17 in the laser scanner unit 16, thereby forming an electrostatic latent image onto the surface of the photo sensitive drum 1.

A pre-exposing lamp 6 and a primary charging unit 2 are arranged over the photo sensitive drum 1. A sensor 3 to measure the surface potential of the drum 1 is arranged at a right upper position over the drum 1. The remaining charges on the surface of the drum 1 are removed by the exposure by the pre-exposing lamp 6 before the electrostatic latent image is formed by the laser beam. Subsequently, the surface of the drum 1 is almost uniformly charged by the primary charging unit 2. Before the electrostatic latent image is formed by the laser beam, the surface of the drum 1 which has been almost uniformly charged is exposed by a predetermined laser light amount. The surface potential of the drum 1 which has been measured by the sensor 3 is returned to a printer control unit (not shown) or the like, thereby controlling a charging amount when the image is formed.

The electrostatic latent image formed on the surface of the drum 1 is developed by the developing apparatus 40 arranged under the drum 1. The developing apparatus 40 is constructed by, for instance, four developing units 41 to 44 each using a two-component developing agent in which each of the toners of MCYK and a carrier are mixed. Each of the developing units approaches the drum 1 only when the image of the corresponding color is developed.

The toner image formed on the surface of the drum 1 is copy transferred onto the recording paper P by the copy transfer device 5. After that, the remaining toner on the surface of the drum 1 is removed by a cleaning device 7, so that the drum 1 is prepared for the formation of the next latent image.

The copy transfer device 5 is constructed by an adsorption charging unit 51, a drum-like copy transfer sheet 52, a copy transfer charging unit 53, a separation charging unit 54, a discharging unit 55, and the like. In the copy transfer device 5, the recording paper P fed from either one of sheet cassettes 31 and 32 is electrostatically adsorbed to the copy transfer sheet 52 by the adsorption charging unit 51. The toner image is copy transferred onto the adsorbed recording paper P by the copy transfer charging unit 53. After that, the paper is separated from the copy transfer sheet 52 by a separating click 8 and the separation charging unit 54. After that, the remaining charges on the sheet 52 is eliminated by the discharging unit 55 and the copy transfer device 5 is prepared for the electrostatic adsorption of the next recording paper P.

The recording paper P on which the toner image had been copy transferred by the copy transfer device 5 and which was separated from the sheet 52 is conveyed to the fixing unit 20 via a copy transfer conveying system 25 and the toner image is fixed onto the paper by the fixing device 20.

The fixing device 20 is constructed by an upper fixing roller 26, a lower fixing roller 27, a fixing cleaner 28, and a fixing heater 29. The fixing unit 20 fuses the toner on the recording paper P by a heat energy of the fixing heater 29 and twines the fused toner and the fibers of the recording paper P by a pressure between the upper and lower fixing rollers 26 and 27. A temperature of the surface of the upper fixing roller 26 has previously been adjusted to an almost predetermined temperature by the fixing heater 29 assembled in almost the central portion. The fixing cleaner 28 is arranged over the fixing roller 26. For example, the dust deposited on the surface of the upper fixing roller 26 is scraped off by using a web or the like in which a silicone oil is impregnated.

The recording paper P on which the image was fixed is conveyed in accordance with a predetermined mode. For example, in the case where the one-sided mode has already been set or in the case where the two-sided mode has already been set and the printing operation of the B side was finished, the recording paper P is delivered onto a paper delivery tray 23 by a pair of paper delivery rollers 24. In the case where the two-sided mode had been set and the printing operation of the A side was finished, the recording paper P is conveyed to the two-sided unit 60 by a two-sided flapper 61.

The two-sided unit 60 is constructed by a pair of reversing rollers 62, a reversing tray 63; a two-sided conveying system 64; a reversal conveying system 65; a reversing guide 66; a two-sided tray 67; and the like. The pair of reversing rollers 62 feed the recording paper P guided to the two-sided conveying system 64 to the reversing tray 63 (in the direction shown by an arrow A in the diagram) by only a predetermined length in accordance with the size of recording paper P and subsequently rotate in the opposite direction and feed the recording paper P in the direction shown by an arrow B in the diagram. The recording paper P is guided to the reversal conveying system 65 and conveyed to the two-sided tray 67. Therefore, the recording paper P put in the two-sided tray 67 has been turned upside down for preparation of the printing operation of the next B side. The reversing guide 66 arranged in the junction portion of the two-sided conveying system 64 and the reversal conveying system 65 is used to prevent the recording paper P from erroneously entering the two-sided conveying system 64 in case of feeding the recording paper P to the reversal conveying system 65.

The recording paper P put on the two-sided tray 67 is again fed to the copy transfer device 5 in a manner substantially similar to the paper feeding operation from either one of the sheet cassettes 31 and 32. The toner image is copy transferred to the B side. After that, the paper is again conveyed to the fixing unit 20. The toner image on the B side is fixed and the paper is delivered onto the paper delivery tray 23 by the pair of paper delivery rollers 24.

Figure 2:
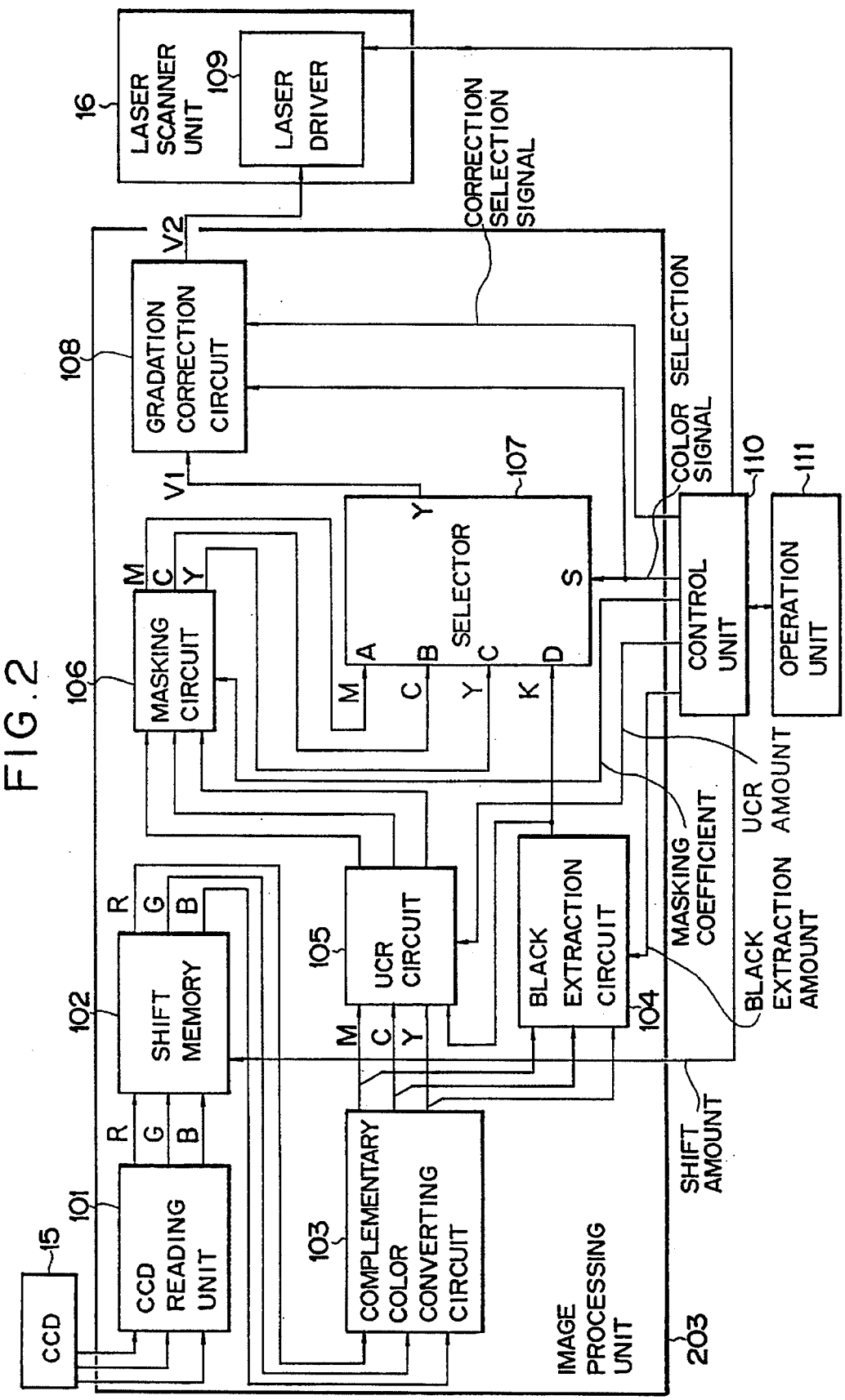
FIG. 2 is a block diagram showing an example of a construction of an image processing unit of the embodiment.

FIG. 2 is a block diagram showing an example of a construction of the image processing unit 203 of the embodiment.

In FIG. 2, reference numeral 110 denotes a control unit which is constructed by a CPU, a ROM, a RAM, an I/O, and the like. The control unit 110 controls the whole apparatus of the embodiment in accordance with programs stored in the ROM or the like. An operation unit 111 which is used for the operator to designate an operating mode or the like of the embodiment is connected to the control unit 110.

Reference numeral 101 denotes a CCD reading unit which is constructed by: amplifiers for respectively amplifying analog RGB signals supplied from the CCD 15; A/D converters for converting the analog RGB signals into the digital RGB signals of, for example, eight bits; shading correction circuits for performing the well-known shading correction; and the like. The CCD reading unit 101 generates digital RGB image data of the original image.

Reference numeral 102 denotes a shift memory to correct, for example, deviations among the colors and pixels of the RGB image data supplied from the CCD reading unit 101 in accordance with a shift amount control signal from the control unit 110.

Reference numeral 103 denotes a complementary color converting circuit for converting the RGB image data supplied from the shift memory 102 into the MCY image data.

Reference numeral 104 denotes a black extraction circuit to extract a black region of the image from the MCY image data supplied from the complementary color converting circuit 103 in accordance with a black extraction amount control signal supplied from the control unit 110 and to generate K image data corresponding to the extracted black region.

Reference numeral 105 denotes a UCR circuit to perform an undercolor removing (UCR) process to the MCY image data supplied from the complementary color converting circuit 103 in accordance with the K image data sent from the black extraction circuit 104 and a UCR amount control signal supplied from the control unit 110.

That is, the black extraction circuit 104 and UCR circuit 105 form the extracted black region in place of the K toner without overlapping the toners of three colors of MCY, thereby executing a process to improve a color reproducibility.

The K image data which is generated from the black extraction circuit 104 is determined by the following equation (1).

$$K = a_1 \cdot \min(C_2, M_2, Y_2) \qquad (1)$$

In the equation (1), $a_1$ denotes a black extraction coefficient and $M_2$, $C_2$, and $Y_2$ indicate MCY image data generated from the complementary color converting circuit 103. The black extraction coefficient $a_1$ is determined by the black extraction amount control signal which is sent from the control unit 110.

The MCY image data which is generated from the UCR circuit 105 is decided by the following equation (2).

$$\left.\begin{array}{lll} M_1 & = & b_1(M_2 - d_1 \cdot K) \\ C_1 & = & b_2(C_2 - d_2 \cdot K) \\ Y_1 & = & b_3(Y_2 - d_3 \cdot K) \end{array}\right\} \qquad (2)$$

In the equation (2), $M_2$, $C_2$, and $Y_2$ denote the MCY image data supplied from the complementary color converting circuit 103, $M_1$, $C_1$, and $Y_1$ indicate MCY image data which is supplied from the UCR circuit 105, and $b_1$ to $b_3$ and $d_1$ to $d_3$ indicate coefficients which are decided by an UCR amount control signal which is supplied from the control unit 110.

Reference numeral 106 denotes a masking circuit to perform a masking process to the MCY image data supplied from the UCR circuit 105 in accordance with a masking coefficient control signal supplied from the control unit 110 in order to eliminate turbidity components of the toners which are used. The MCY image data which is supplied from the masking circuit 106 is decided by the following equation (3).

$$\begin{bmatrix} M_0 \\ C_0 \\ Y_0 \end{bmatrix} \begin{bmatrix} a_{11} & a_{12} & a_{13} \\ a_{21} & a_{22} & a_{23} \\ a_{31} & a_{32} & a_{33} \end{bmatrix} \begin{bmatrix} M_1 \\ C_1 \\ Y_1 \end{bmatrix} \qquad (3)$$

In the equation (3), $a_{11}$ to $a_{33}$ denote masking coefficients; $M_1$, $C_1$, and $Y_1$ indicate MCY image data supplied from the UCR circuit 105; and $M_0$, $C_0$, and $Y_0$ indicate MCY image data which is supplied from the masking circuit 106. The masking coefficients $a_{11}$ to $a_{33}$ are decided by the masking coefficient control signal which is sent from the control unit 110.

Reference numeral 107 denotes a selector for selecting the image data of one color component from the MCYK image data supplied from the masking circuit 106 and black extraction circuit 104 in accordance with a color selection signal sent from the control unit 110 to a selecting terminal S and generates an image signal $V_1$. To area sequentially form an image in accordance with MCYK, the control unit 110 allows the selector 107 to sequentially select the image data in accordance with the order to MCYK by the color selection signal.

Figure 3:
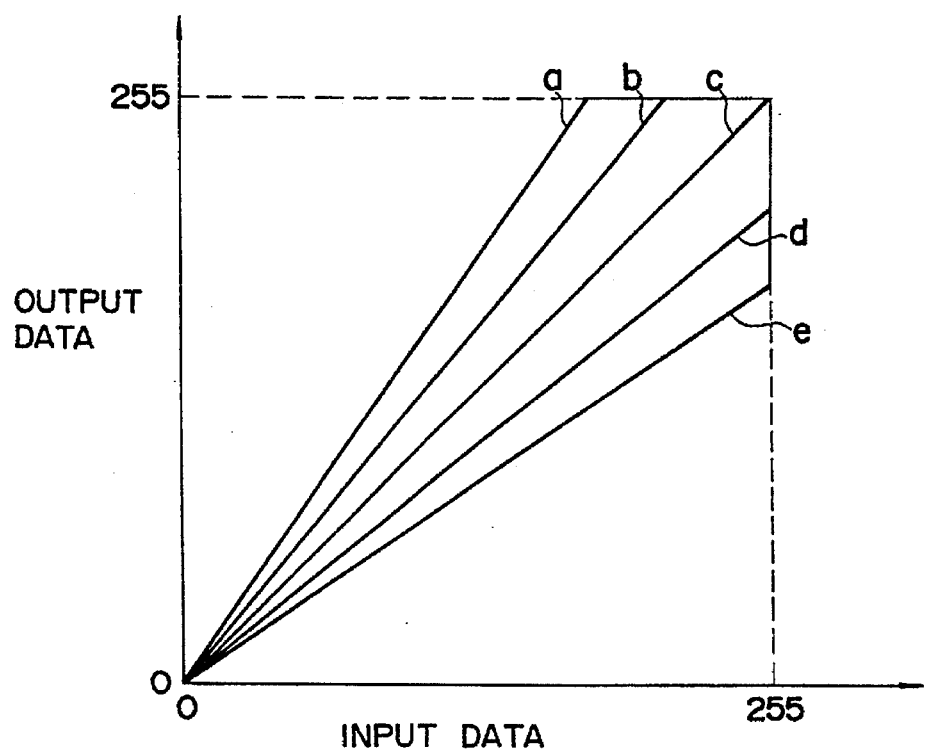
FIG. 3 is a diagram showing an example of gradation correcting characteristics of a gradation correction circuit of the embodiment.
Figure 4:
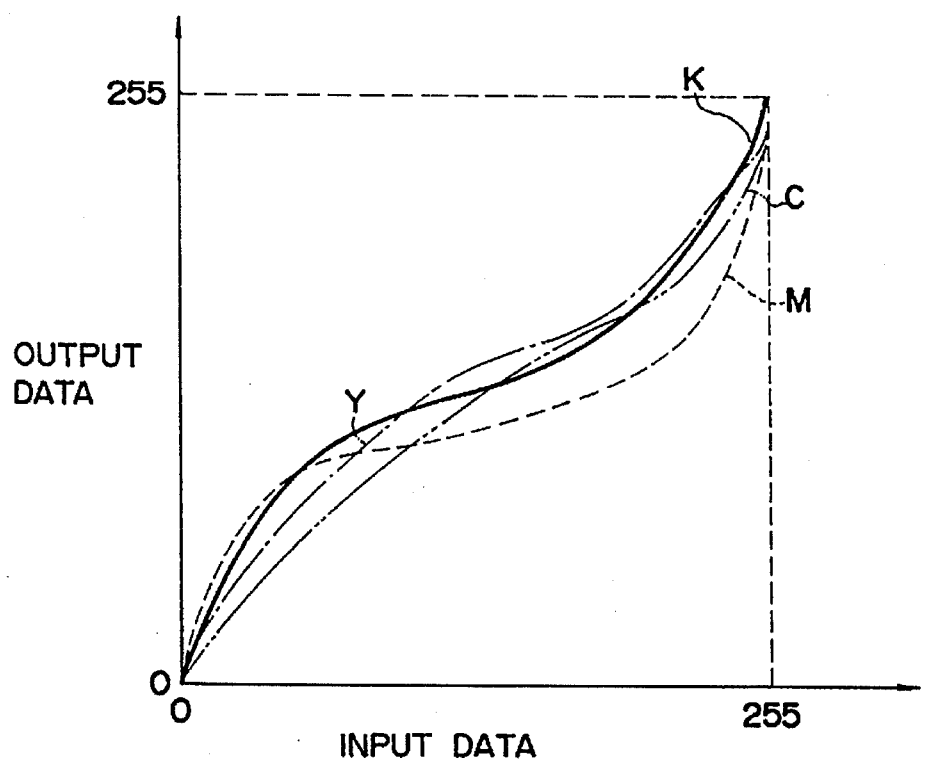
FIG. 4 is a diagram showing an example of gradation correcting characteristics of the gradation correction circuit of the embodiment.

Reference numeral 108 denotes a gradation correction circuit for performing a gradation correction as shown in FIG. 3 or 4 to the image signal $V_1$ supplied from the selector 107 and outputting an image signal $V_2$. For example, the gradation correction circuit 108 performs a density correction to the image signal in accordance with either one of converting characteristics a to e shown as an example in FIG. 3 selected by a correction selection signal supplied from the control unit 110. The gradation correction circuit 108 selects either one of γ converting characteristics shown as an example in FIG. 4 in accordance with the color selection signal supplied from the control unit 110 and performs the density correction to the image signal in order to make output characteristics of a printer 112 linear every color.

Reference numeral 109 denotes a laser driver included in the laser scanner unit 16 mentioned above. The laser driver 109 modulates and drives the semiconductor laser on the basis of the image signal $V_2$ supplied from the gradation correction circuit 108, thereby forming an image having a dark/light expression.

When a copy start is instructed after the operator selected a two-sided output mode or the like by the operation unit 111, the image scanner unit 201 starts the reading operation at the first time of the original image. The printer unit 202 feeds the recording paper P and starts the printing operation to the A side.

In this instance, as mentioned above, the control unit 110 sends the control signals of the shift amount, black extraction amount, UCR amount, masking coefficient, and the like to predetermined blocks and sets proper parameters to the respective blocks.

As mentioned above, the control unit 110 allows the selector 107 to select M image data corresponding to the first time by the color selection signal as mentioned above, thereby allowing the gradation correction circuit 108 to select an M curve shown as an example in FIG. 4.

As mentioned above, the control unit 110 allows the gradation correction circuit 108 to select, for example, the e curve shown as an example in FIG. 3 by a correction selection signal. Namely, the control unit 110 allows the gradation correction circuit 108 to select, for example, the e curve in FIG. 3 in order to set a density of the M toner that is recorded onto the A side to be lower than a standard density in consideration of a heat energy which is applied to the M toner when the image is printed onto the B side later.

After completion of the recording at the first time, the control unit 110 sequentially executes the recording at the second time to the fourth time in a manner substantially similar to that at the first time. The control unit 110, however, allows the selector 107 to select the C image data at the second time, the Y image data at the third time, and the K image data at the fourth time. The control unit 110 allows the gradation correction circuit 108 to select the C curve in FIG. 4 and, for example, the d curve in FIG. 3 at the second time, the Y curve in FIG. 4 and, for example, the c curve in FIG. 3 at the third time, and the K curve in FIG. 4 and, for example, the c curve in FIG. 3 at the fourth time.

After completion of the printing operation of the A side, the control unit 110 executes the printing operation of the B side in substantially the same manner as that of the A side. The control unit 110, however, allows the gradation correction circuit 108 to select, for instance, the c curve in FIG. 3 at each of the first to fourth times when the B side is recorded.

According to the embodiment as described above, by changing the density correcting characteristics of the gradation correction circuit 108 in accordance with the printing surface and the toner color, a difference of the hues between the image printed on the A side and the image printed on the B side which occurs due to a difference of the color generations of the same color toner due to an unevenness of the heat energy can be reduced. An image of an almost uniform hue with respect to both of the A and B sides can be formed.

[Second embodiment]

The second embodiment according to the invention will now be described. In the second embodiment, the portions similar to those in the first embodiment are designated by the same reference numerals and their detailed descriptions are omitted here.

In the first embodiment, by changing the density correcting characteristics of the gradation correction circuit 108 in accordance with the A side or B side, the hue is uniformed. In the second embodiment, explanation will now be made with respect to an example in which the hue is uniformed by changing the masking coefficients of the masking circuit 106 in accordance with the A side or B side.

That is, in the second embodiment, since there is a tendency such that the hue is enhanced because the M toner recorded at the first time onto the A side is twined with the fibers of the recording paper P, the masking coefficients are changed for the A side or B side in consideration of an enhanced amount of the hue.

In the embodiment, the masking coefficients $a_{11}$ to $a_{33}$ described in the equation (3) of the first embodiment are set, for example, as shown in the following equations (4) and (5).

$$\begin{bmatrix} a_{11} & a_{12} & a_{13} \\ a_{21} & a_{22} & a_{23} \\ a_{31} & a_{32} & a_{33} \end{bmatrix} = \begin{bmatrix} 1.50 & -1.25 & 0.33 \\ -0.25 & 1.76 & -0.57 \\ -0.12 & -0.10 & 1.53 \end{bmatrix} \quad * \text{Side A} \quad (4)$$

$$\begin{bmatrix} a_{11} & a_{12} & a_{13} \\ a_{21} & a_{22} & a_{23} \\ a_{31} & a_{32} & a_{33} \end{bmatrix} = \begin{bmatrix} 2.44 & -1.25 & 0.33 \\ -0.20 & 1.76 & -0.57 \\ -0.02 & -0.10 & 1.53 \end{bmatrix} \quad * \text{Side B} \quad (5)$$

As described above, according to the embodiment, by changing the masking coefficients of the masking circuit 106 in accordance with the printing surface, a difference of the hues between the images printed on the A and B sides which occurs due to a difference of the color generations of the M toner due to an unevenness of the heat energy can be reduced. An image of an almost uniform hue with respect to the A and B sides can be formed.

[Third embodiment]

The third embodiment according to the invention will now be described. In the third embodiment, the portions similar to those in the first embodiment are designated by the same reference numerals and their detailed descriptions are omitted here.

In the first embodiment, the hue has been uniformed by changing the density correcting characteristics of the gradation correction circuit 108 in accordance with the A side or B side. In the third embodiment, explanation will now be made with respect to an example in which the hue is uniformed by changing the coefficients of the UCR process described in the equation (2) of the first embodiment in accordance with the A side or B side, for instance, in only the case of recording by the M toner.

That is, in the third embodiment, since there is a tendency such that the hue is enhanced because the M toner which was recorded at the first time onto the A side is twined with the fibers of the recording paper P, an UCR amount upon recording of the M toner to the A side is set to be larger than that upon recording of the M toner to the B side in consideration of the enhanced amount of the hue.

According to the embodiment as mentioned above, a difference of the hues between the images printed on the A and B sides which occurs due to a difference of the color generations of the M toner due to an unevenness of the heat energy can be reduced by changing the coefficients of the UCR process of the UCR circuit 105 upon recording of the M toner in accordance with the printing surface. An image of an almost uniform hue with respect to the A and B sides can be formed.

In the above embodiment, the UCR process, masking process, and gradation correcting process have been changed in accordance with the A side or B side. However, the invention can be also similarly applied to the other processes.

[Fourth embodiment]

The fourth embodiment according to the present invention will now be described hereinbelow. In the fourth embodiment, the portions similar to those in the first embodiment are designated by the same reference numerals and their detailed descriptions are omitted here.

Figure 5:
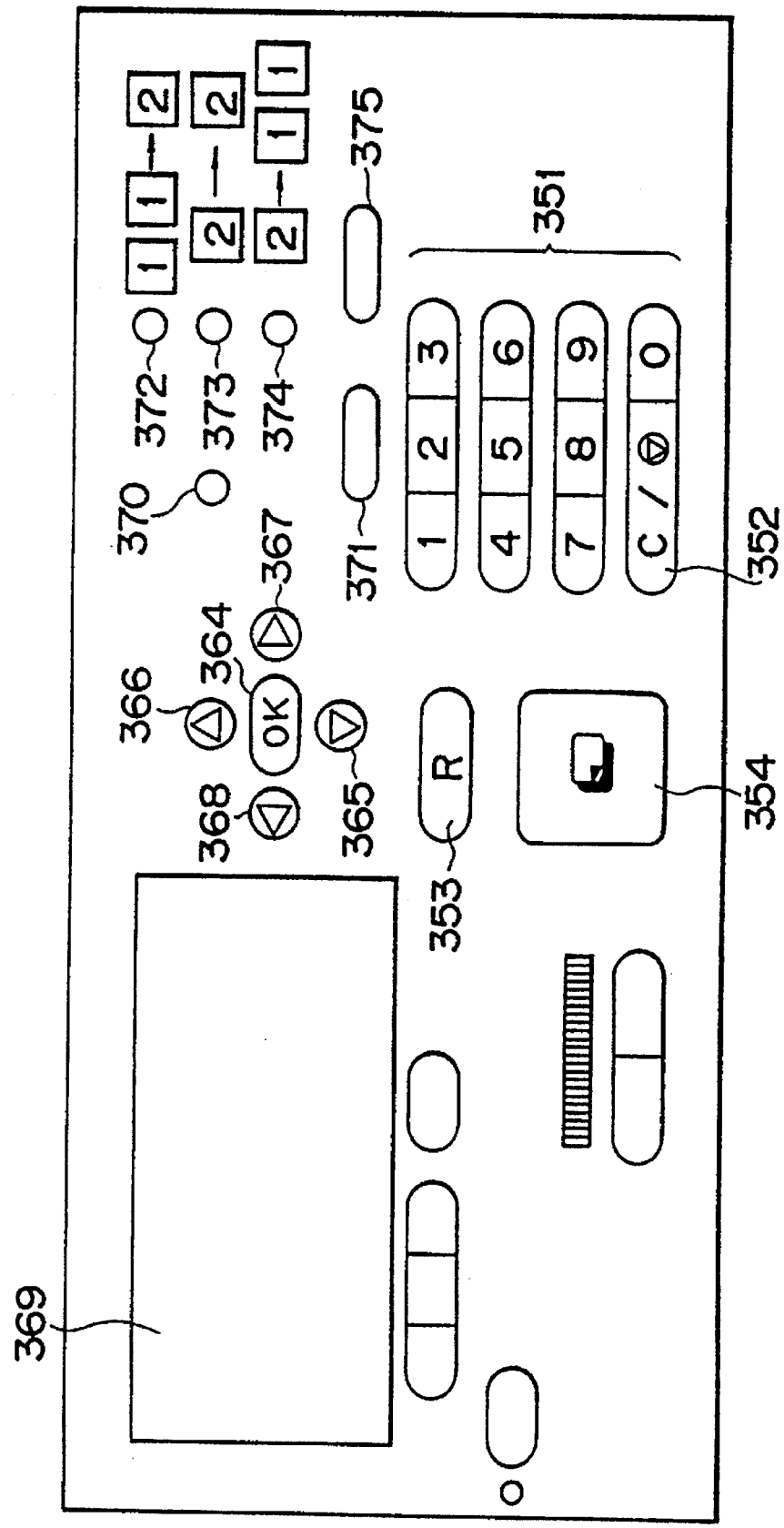
FIG. 5 is a front view showing an example of a main section of an operating unit of an image forming apparatus of the fourth embodiment according to the invention.

FIG. 5 is a front view showing an example of a main section of the operation unit 111 of an image forming apparatus of the fourth embodiment according to the present invention.

In FIG. 5, reference numeral 351 denotes a ten-key to input the number of copies or the like.

Reference numeral 352 denotes a clear/stop key to clear the set number of copies or to stop the copying operation in the embodiment.

Reference numeral 353 denotes a reset key to reset all of the set values in the embodiment to predetermined values.

Reference numeral 354 denotes a start key. In the embodiment, the copying operation or the like is started by operating the start key 354.

Reference numeral 369 denotes a display panel to make the detailed mode setting operations easy. A display changes in accordance with the set mode. For example, a cursor displayed is moved by operating cursor keys 365 to 368 and the setting mode is decided by pressing an OK key 364.

Reference numeral 371 denotes a paper thickness setting key. A "thick paper mode" is set by this key 371 in case of printing to a recording paper of a thickness which is thicker than the standard value. When the "thick paper mode" is set, an LED (light emitting diode) 370 is lit on, thereby indicating the set state of such a mode.

Reference numeral 375 denotes a copy mode key which is operated to select either one of the copy modes such as "one-sided mode" to perform a one-sided output from a one-sided original, "one-sided/two-sided mode" to perform a two-sided output from a one-sided original, "two-sided mode" to perform a two-sided output from a two-sided original, "two-sided/one-sided mode" to perform two one-sided outputs from a two-sided original, and the like. For example, "one-sided mode" has been set as a predetermined copy mode. LEDs 372 to 374 are lit on in accordance with the set copy mode. For example, in case of the "one-sided/two-sided mode", the LED 372 is lit on. In case of the "two-sided mode", the LED 373 is lit on. In case of the "two-sided/one-sided mode", the LED 374 is lit on. In case of the "one-sided mode", all of the LEDs 372 to 374 are lit off.

When the copy start key is instructed after the operator selected the mode to perform the two-sided output or the like by operating the operation unit 111, the image scanner unit 201 starts the reading operation at the first time of the original image. The printer unit 202 feeds the recording paper P and starts the printing operation to the A side.

In this instance, as mentioned above, the control unit 110 sends the control signals of the shift amount, black extraction amount, UCR amount, masking coefficients, and the like to predetermined blocks and proper parameters are set into the respective blocks.

As mentioned above, the control unit 110 allows the selector 107 to select the M image data corresponding to the first time by the color selection signal and also allows the gradation correction circuit 108 to select the M curve shown as an example in FIG. 4.

As mentioned above, the control unit 110 allows the gradation correction circuit 108 to select, for example, the e curve shown as an example in FIG. 3 by the correction selection signal. That is, the control unit 110 allows the gradation correction circuit 108 to select, for example, the e curve in FIG. 3 in order to set the density of M toner which is recorded onto the A side to be lower than a standard value in consideration of the heat energy which is applied to the M toner when the B side is subsequently printed. When the mode to perform a one-sided output is selected, the control unit 110 allows the gradation correction circuit 108 to select, for example, the c curve shown in FIG. 3 in order to set the density of M toner which is recorded onto the A side to the standard value.

After completion of the recording at the first time, the control unit 110 sequentially executes the recording operations at the second to fourth times in almost the same manner as that at the first time. However, the control unit 110 allows the selector 107 to select the C image data at the second time, the Y image data at the third time, and the K image data at the fourth time. The control unit 110 also allows the gradation correction circuit 108 to select the C curve in FIG. 4 and, for example, the d curve in FIG. 3 at the second time, the Y curve in FIG. 4 and, for example, the c curve in FIG. 3 at the third time, and the K curve in FIG. 4 and, for example, the c curve in FIG. 3 at the fourth time.

After completion of the printing to the A side, the control unit 110 executes the printing to the B side in substantially the same manner as that for the A side. When the B side is recorded, however, for example, the control unit 110 allows the gradation correction circuit 108 to select, for instance, the b curve in FIG. 3 at the first to fourth times in order to set a density of each toner which is recorded onto the B side to be higher than the standard value in consideration of a point that the fibers of the recording paper P have been crushed by the pressure which had already been applied upon recording to the A side.

According to the embodiment as described above, by changing the density correcting characteristics of the gradation correction circuit 108 in accordance with the printing surface and the toner color, a difference of the hues between the images printed on the A and B sides which occurs due to a difference of the color generations of the same color toner due to the unevenness of the heat energy and the career of the pressure applied to the recording paper P can be reduced. An image of an almost uniform hue with respect to the A and B sides can be formed.

According to the embodiment, further, since the density correcting characteristics of the gradation correction circuit 108 are changed in accordance with the two-sided output mode or one-sided output mode, a difference of the hues in the case where the same image was printed to one side and the case where the same image was printed to two sides can be reduced. An image of an almost uniform hue can be formed irrespective of the output mode such as two-sided output mode or one-sided output mode.

[Fifth embodiment]

The fifth embodiment according to the invention will now be described hereinbelow. In the fifth embodiment, the portions similar to those in the first and fourth embodiments are designated by the same reference numerals and their detailed descriptions are omitted here.

In the fifth embodiment, the hue has been uniformed by changing the density correcting characteristics of the gradation correction circuit 108 in accordance with the A side or B side. In the fifth embodiment, explanation will now be made with respect to an example in which the hue is uniformed by changing the masking coefficients of the masking circuit 106 in accordance with the A side or B side and in accordance with the two-sided output mode or the one-sided output mode.

That is, in the fifth embodiment, since there is a tendency such that the hue is enhanced because the M toner recorded at the first time to the A side are twined with the fibers of the recording paper P, the masking coefficients are changed in accordance with the A side or B side or in accordance with the two-sided output mode and the one-sided output mode in consideration of the enhanced hue amount.

In the embodiment, the masking coefficients $a_{11}$ to $a_{33}$ described in the equation (3) in the first embodiment are set by the following equations (6), (7), and (8).

* Side A in the two-sided output mode $$\begin{bmatrix} a_{11} & a_{12} & a_{13} \\ a_{21} & a_{22} & a_{23} \\ a_{31} & a_{32} & a_{33} \end{bmatrix} = \begin{bmatrix} 1.50 & -1.25 & 0.33 \\ -0.25 & 1.76 & -0.57 \\ -0.12 & -0.10 & 1.53 \end{bmatrix} \quad (6)$$

* Side B in the two-sided output mode $$\begin{bmatrix} a_{11} & a_{12} & a_{13} \\ a_{21} & a_{22} & a_{23} \\ a_{31} & a_{32} & a_{33} \end{bmatrix} = \begin{bmatrix} 2.85 & -1.25 & 0.33 \\ -0.20 & 1.76 & -0.57 \\ -0.02 & -0.10 & 1.86 \end{bmatrix} \quad (7)$$

* In the two-sided output mode $$\begin{bmatrix} a_{11} & a_{12} & a_{13} \\ a_{21} & a_{22} & a_{23} \\ a_{31} & a_{32} & a_{33} \end{bmatrix} = \begin{bmatrix} 2.44 & -1.25 & 0.33 \\ -0.20 & 1.76 & -0.57 \\ -0.02 & -0.10 & 1.53 \end{bmatrix} \quad (8)$$

As described above, according to the embodiment, by changing the masking coefficients of the masking circuit 106 in accordance with the printing surface, a difference of the hues between the images printed on the A and B sides which occurs due to a difference of the color generations of the M toner due to the unevenness of the heat energy and the career of the pressure applied to the recording paper P can be reduced. An image of an almost uniform hue with respect to the A and B sides can be formed.

According to the embodiment, further, since the masking coefficients of the masking circuit 106 are changed in accordance with the two-sided output mode or the one-sided output mode, a difference of the hues in the case where the same image was printed to one side and in the case where the same image was printed to two sides can be reduced. An image of an almost uniform hue can be formed irrespective of the output mode such as two-sided output mode or one-sided output mode.

[Sixth embodiment]

The sixth embodiment according to the invention will now be described hereinbelow. In the sixth embodiment, the portions similar to those in the first and fourth embodiments are designated by the same reference numerals and their detailed descriptions are omitted here.

In the fourth embodiment, the hue has been uniformed by changing the density correcting characteristics of the gradation correction circuit 108. In the sixth embodiment, explanation will now be made with respect to an example in which the hue is uniformed by changing the coefficients of the UCR processes described in the equation (2) in the first embodiment in accordance with the A side or B side and in accordance with the two-sided output mode or one-sided output mode, for instance, only in case of recording by the M toner.

That is, in the sixth embodiment, since there is a tendency such that the hue is enhanced because the M toner recorded to the A side at the first time is twined with the fibers of the recording paper P, a UCR amount upon recording of the M toner to the A side is controlled so as to be larger as compared with that upon recording of the M toner in the one-sided output mode in consideration of the enhanced hue amount. On the other hand, upon recording to the B side, since the fibers of the recording paper have already been crushed upon recording to the A side, it becomes hard that the toner of the B side is twined to the fibers of the recording paper and a density of the whole image formed decreases. Therefore, a UCR amount in the recording to the B side is controlled so as to be smaller than that upon recording in the one-sided output mode in consideration of the decreased density amount.

According to the embodiment as described above, by changing the coefficients of the UCR process of the UCR circuit 105 in accordance with the printing surface, a difference of the hues between the image printed on the A side and the image printed on the B side which occurs due to a difference of the color generations of the M toner due to the unevenness of the heat energy and the career of the pressure applied to the recording paper P can be reduced. An image of an almost uniform hue with respect to the A and B sides can be formed.

According to the embodiment, further, since the coefficients of the UCR process in the UCR circuit 105 are changed in accordance with the two-sided output mode or one-sided output mode, a difference of the hues in the case where the same image was printed to one side and in the case where the same image was printed to two sides can be reduced. An image of an almost uniform hue can be formed irrespective of the output mode such as two-sided output mode or one-sided output mode.

In the above embodiment, the UCR process, masking process, and gradation correcting process have been changed in accordance with the A side or B side. However, the invention can be also similarly applied to the other corrections.

[Seventh embodiment]

The seventh embodiment according to the invention will now be described hereinbelow. In the seventh embodiment, the portions similar to those shown in the first and fourth embodiments are designated by the same reference numerals and their detailed descriptions are omitted here.

According to the seventh embodiment, the gradation correction is performed by the gradation correction circuit 108 in consideration of a fact that in case of printing to a recording paper that is thicker than the standard thickness, a heat energy which is subjected to the A side upon recording to the B side is smaller as compared with the heat energy upon recording to the standard recording paper.

When the copy start is instructed after the operator selected a two-sided output mode or the like by the operation unit 111, the image scanner unit 201 starts the reading operation at the first time of the original image and the printer unit 202 feeds the recording paper P and starts the printing to the A side.

In this instance, as mentioned above, the control unit 110 sends the control signals of the shift amount, black extraction amount, UCR amount, masking coefficient, and the like to predetermined blocks and sets the proper parameters into the blocks, respectively.

As mentioned above, the control unit 110 allows the selector 107 to select the M image data corresponding to the first time by a color selection signal and also allows the gradation correction circuit 108 to select the M curve shown as an example in FIG. 4.

As mentioned above, the control unit 110 allows the gradation correction circuit 108 to select, for example, the e curve shown as an example in FIG. 3 by a correction selection signal. That is, the control unit 110 allows the gradation correction circuit 108 to select, for example, the e curve shown in FIG. 3 in order to set a density of M toner that is recorded to the A side to be lower than the standard value in consideration of the heat energy which is applied to the M toner when the B side is printed later. In the case where the foregoing "thick paper mode" is selected, the control unit 110 allows the gradation correction circuit 108 to select, for example, the d curve shown in FIG. 3 in order to set a density of M toner that is recorded to the A side to be slightly lower than the standard density.

After completion of the recording at the first time, the control unit 110 sequentially executes the recording operations from the second time to the fourth time in a manner similar to the first time. The control unit 110, however, allows the selector 107 to select the C image data at the second time, the Y image data at the third time, and the K image data at the fourth time. The control unit 110 also allows the gradation correction circuit 108 to select the C curve in FIG. 4 and, for example, the d curve in FIG. 3 at the second time, the Y curve in FIG. 4 and, for example, the c curve in FIG. 3 at the third time, and the K curve in FIG. 4 and, for example, the c curve in FIG. 3 at the fourth time.

After completion of the printing to the A side, the control unit 110 executes the printing to the B side in a manner similar to the A side. Upon recording to the B side, however, for instance, the control unit 110 allows the gradation correction circuit 108 to select, for example, the c curve in FIG. 3 at the first to fourth times.

According to the embodiment as described above, by changing the density correcting characteristics of the gradation correction circuit 108 in accordance with the printing surface and the toner color, a difference of the hues between the image printed on the A side and the image printed on the B side which occurs due to a difference of the color generations of the same color toner due to an unevenness of the heat energy can be reduced. An image of an almost uniform hue with respect to the A and B sides can be formed.

According to the embodiment, further, in the case where the "thick paper mode" has been set and the M toner is recorded to the A side, the density correcting characteristics of the gradation correction circuit 108 are changed and the density of M toner that is recorded to the A side is set to be slightly higher than the density upon recording to the recording paper of a standard thickness. Consequently, a difference of the hues in the case where the same image was printed to two sides of the recording paper of a standard thickness and in the case where the same image was printed to two sides of the recording paper which is thicker than the standard thickness can be reduced. An image of an almost uniform hue can be formed.

[Eighth embodiment]

The eighth embodiment according to the invention will now be described hereinbelow. In the eighth embodiment, the portions similar to those in the first, fourth, and seventh embodiments are designated by the same reference numerals and their detailed descriptions are omitted here.

The seventh embodiment has been described with respect to the example in which the thickness of recording paper P is set by the operator by operating the operation unit 111. In the eighth embodiment, an example in which a thickness of recording paper P is detected will now be described.

Figure 6:
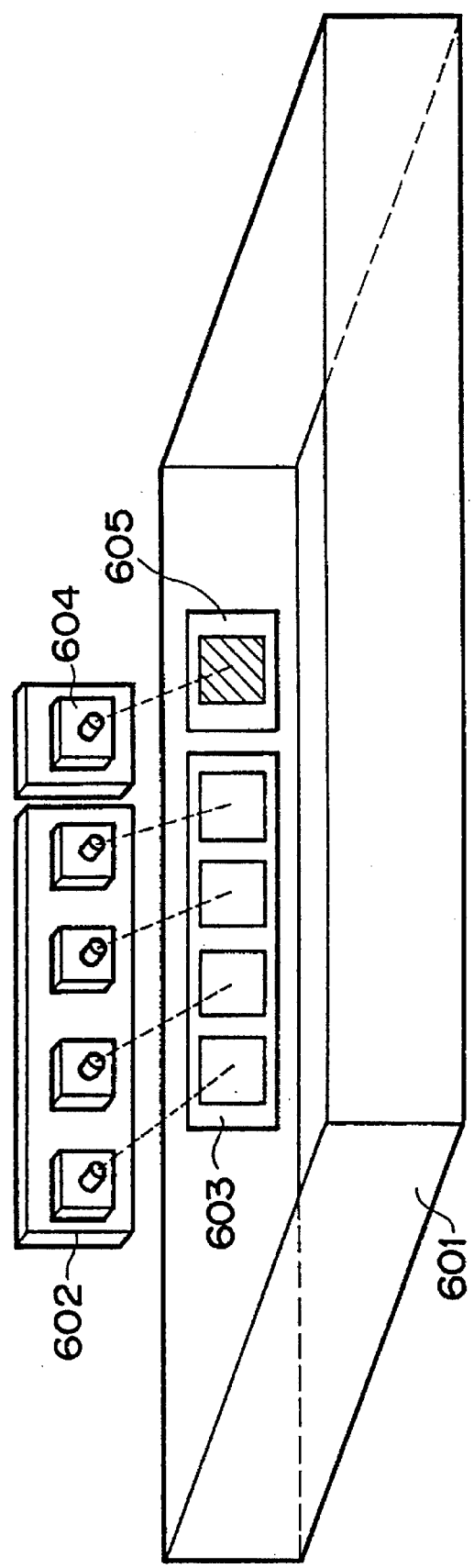
FIG. 6 is a schematic diagram showing an example of a sheet cassette of an image forming apparatus of the eighth embodiment according to the invention.

FIG. 6 is an external view showing an example of a sheet cassette of an image forming apparatus of the eighth embodiment according to the invention.

In FIG. 6, reference numeral 601 denotes a cassette on which the recording papers P are stacked.

Reference numeral 602 denotes a size detecting switch which is constructed by a plurality of switches. The switch 602 is arranged in the printer unit 202 and a detection output signal of the switch 602 is sent to the control unit 110 shown in FIG. 2 or the like. The switch 602 detects a size of recording paper P put on the cassette 601. Since a size detecting technique is a well-known technique, its detailed description is omitted here. However, for example, it is possible to construct in a manner such that a plurality of windows 603 arranged on the side plate of the cassette 601 are closed or opened in accordance with the size of recording paper P which is put in the cassette 601. In this instance, the closed window turns on the switch corresponding to the closed window. The open window turns off the switch corresponding to the open window. Therefore, the control unit 110 or the like can obtain the size information of the recording paper P put in the cassette 601.

Reference numeral 604 denotes a paper thickness detecting switch arranged in the printer 202. A detection output signal of the switch 604 is sent to the control unit 110 or the like. The paper thickness detecting switch 604 detects a thickness of recording paper P which is put in the cassette 601. For example, it is possible to construct in a manner such that a window 605 is closed in case of the cassette in which thick papers are stacked and that the window 605 is opened in case of the cassette in which recording papers which are not so thick are stacked. With such a construction, the paper thickness detecting switch 604 is turned on in case of the cassette in which the thick papers are stacked. The switch 604 is turned off in case of the cassette in which recording papers which are not so thick are stacked. Therefore, the control unit 110 or the like can judge whether the recording papers P which are stacked to the cassette 601 are thick papers or papers having the standard thickness on the basis of the output signal of the switch 604.

That is, in the two-sided output mode, when the control unit 110 detects the thick paper by the switch 604, the control unit 110 allows the gradation correction circuit 108 to select, for example, the d curve in FIG. 3 to set a density of M toner that is recorded to the A side to be slightly lower than the standard density in a manner similar to the seventh embodiment.

According to the embodiment as described above, there is an effect almost similar to that in the seventh embodiment. Further, even if the operator forgot to set the "thick paper mode", in case of printing to two sides of the thick paper, a proper density correction to reduce a difference of the hues is executed.

[Ninth embodiment]

Figure 9:
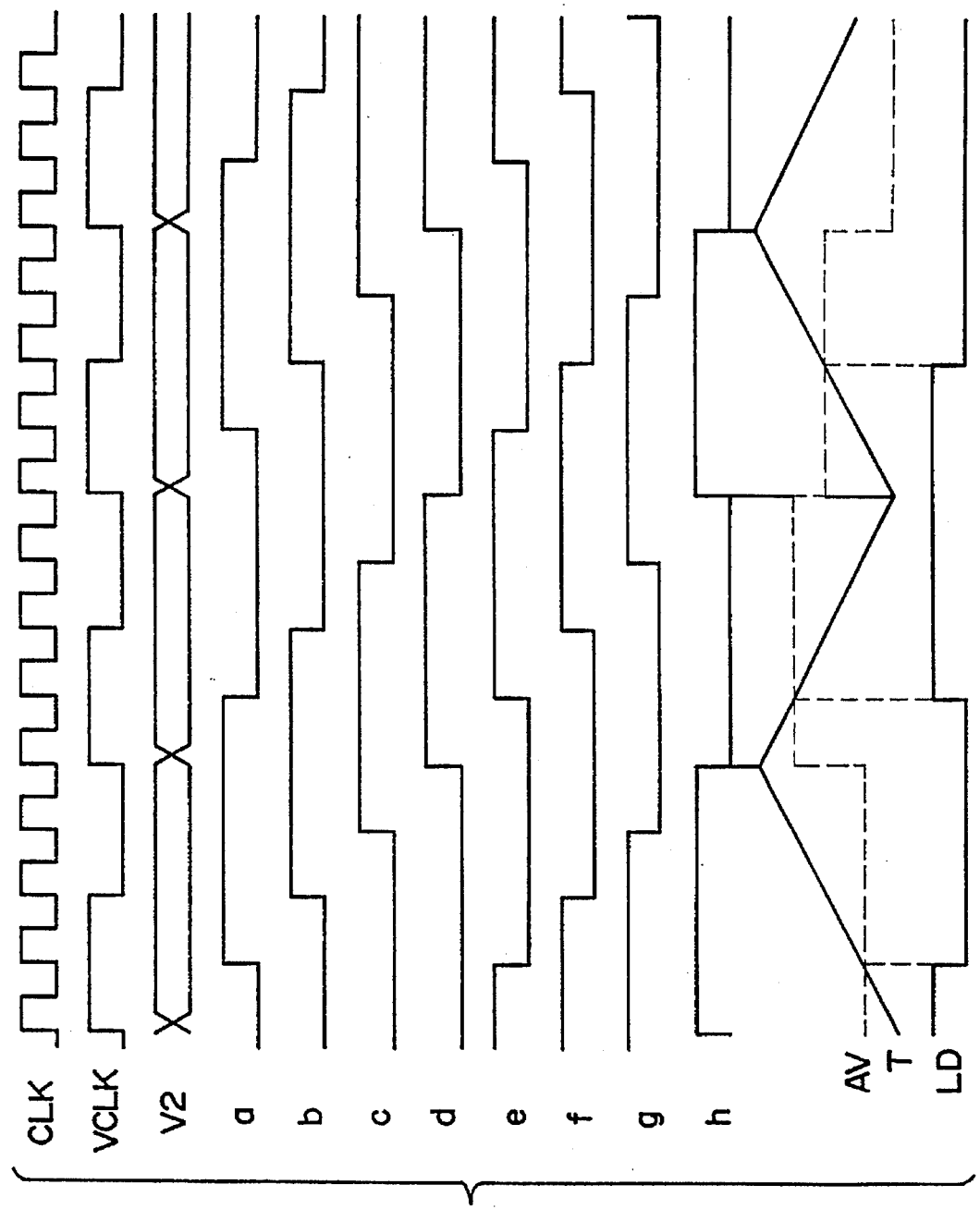
FIG. 9 is a timing chart showing an example of the operation of the PWM modulating circuit of the embodiment.

The ninth embodiment according to the invention will now be described hereinbelow. In FIG. 9, the portions similar to those in the first, fourth, and eighth embodiments are designated by the same reference numerals and their detailed descriptions are omitted here.

In the seventh embodiment, the hue has been uniformed by changing the density correcting characteristics of the gradation correction circuit 108 in accordance with the A side or B side and in accordance with the thickness of recording paper. In the ninth embodiment, explanation will now be made with respect to an example in which the hue is uniformed by changing the masking coefficients of the masking circuit 106 in accordance with the A side or B side and in accordance with the thickness of recording paper.

That is, in the ninth embodiment, since there is a tendency such that the hue is enhanced because the M toner recorded to the A side at the first time is twined with the fibers of the recording paper P, the masking coefficients are changed for the A side and B side in consideration of the enhanced hue amount. In case of a thick recording paper, the masking coefficients for the A side and B side are changed in consideration of a decreased amount of the heat energy which reaches the A side upon recording to the B side.

In the embodiment, the masking coefficients $a_{11}$ to $a_{33}$ described in the equation (3) in the first embodiment are set, for example, by the following equations (9), (10), and (11).

* Side A of the recording paper of a standard thickness $$\begin{bmatrix} a_{11} & a_{12} & a_{13} \\ a_{21} & a_{22} & a_{23} \\ a_{31} & a_{32} & a_{33} \end{bmatrix} = \begin{bmatrix} 1.50 & -1.25 & 0.33 \\ -0.25 & 1.76 & -0.57 \\ -0.12 & -0.10 & 1.53 \end{bmatrix} \quad (9)$$

* Side B of the thick paper $$\begin{bmatrix} a_{11} & a_{12} & a_{13} \\ a_{21} & a_{22} & a_{23} \\ a_{31} & a_{32} & a_{33} \end{bmatrix} = \begin{bmatrix} 1.90 & -1.25 & 0.33 \\ -0.22 & 1.76 & -0.57 \\ -0.08 & -0.10 & 1.53 \end{bmatrix} \quad (10)$$

* One-sided printing and side B $$\begin{bmatrix} a_{11} & a_{12} & a_{13} \\ a_{21} & a_{22} & a_{23} \\ a_{31} & a_{32} & a_{33} \end{bmatrix} = \begin{bmatrix} 2.44 & -1.25 & 0.33 \\ -0.20 & 1.76 & -0.57 \\ -0.02 & -0.10 & 1.53 \end{bmatrix} \quad (11)$$

As described above, according to the embodiment, by changing the masking coefficients of the masking circuit 106 in accordance with the printing surface and the thickness of recording paper, a difference of the hues between the image printed on the A side and the image printed on the B side which occurs due to a difference of the color generations of the M toner due to an unevenness of the heat energy can be reduced. An image of an almost uniform hue with respect to the A side or B side and with respect to the thick recording paper and the recording paper of the standard thickness can be formed.

[Tenth embodiment]

The tenth embodiment according to the present invention will now be described hereinbelow. In the tenth embodiment, the portions similar to those in the first, fourth, and eighth embodiments are designated by the same reference numerals and their detailed descriptions are omitted here.

In the seventh embodiment, the hue has been uniformed by changing the density correcting characteristics of the gradation correction circuit 108. In the tenth embodiment, explanation will now be made with respect to an example in which the hue is uniformed by changing the coefficients of the UCR process described in the equation (2) of the first embodiment in accordance with the A side or B side and in accordance with the thickness of recording paper, for example, only in case of recording by the M toner.

That is, in the tenth embodiment, since there is a tendency such that the hue is enhanced because the M toner recorded to the A side at the first time is twined to the fibers of the recording paper P, a UCR amount upon recording of the M toner to the A side is controlled so as to be slightly larger than that upon recording of the M toner to the B side in consideration of the enhanced hue amount. Further, in case of recording to a thick paper, the UCR amount upon recording of the M toner to the A side of a thick paper is controlled so as to be slightly smaller than that upon recording of the M toner to the A side of a recording paper of the standard thickness.

According to the embodiment as described above, by changing the coefficients of the UCR process of the UCR circuit 105 upon recording of the M toner in accordance with the printing surface and the thickness of recording paper, a difference of the hues between the image printed on the A side and the image printed on the B side which occurs due to a difference of the color generations of the M toner due to the unevenness of the heat energy can be reduced. An image of an almost uniform hue with respect to the A side and B side can be formed.

In the above embodiment, although the UCR process, masking process, and gradation correcting process have been changed in accordance with the A side or B side, the invention can be also similarly applied to the other corrections.

[Eleventh embodiment]

The eleventh embodiment according to the present invention will now be described. In the eleventh embodiment, the portions similar to those in the first embodiment are designated by the same reference numerals and their detailed descriptions are omitted here.

Figure 7:
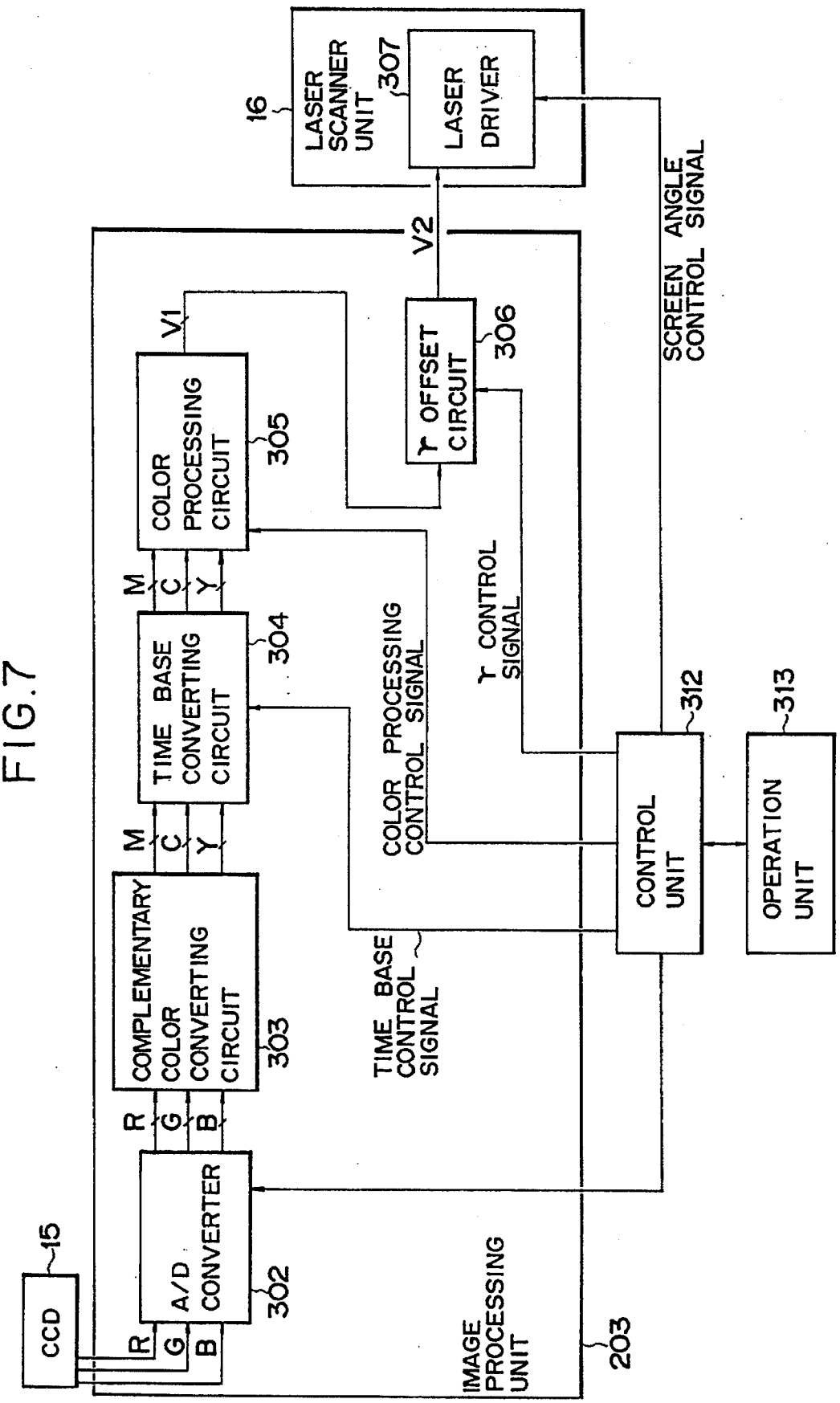
FIG. 7 is a block diagram showing an example of an image processing unit of the eleventh embodiment according to the invention.

FIG. 7 is a block diagram showing an example of a construction of the image processing unit 203 in the image forming apparatus of the eleventh embodiment according to the invention.

In FIG. 7 reference numeral 312 denotes a control unit which is constructed by a CPU, a ROM, a RAM, an I/O, and the like and controls the whole apparatus of the embodiment by programs stored in the ROM or the like. An operation unit 313 which is used to designate an operating mode or the like of the embodiment by the operator is connected to the control unit 312.

Reference numeral 302 denotes an A/D converter for converting the analog RGB signal supplied from the CCD 15 shown in FIG. 1 into the digital RGB signal of, for example, eight bits.

Reference numeral 303 denotes a complementary color converting circuit to convert the RGB image data supplied from the A/D converter 302 into the MCY image data.

Reference numeral 304 denotes a time base converting circuit. Since a frequency of the MCY image data that is supplied from the complementary color converting circuit 303 differs from a frequency of the subsequent MCY image data, the time base converting circuit 304 frequency converts the supplied MCY image data in accordance with a time base control signal sent from the control unit 312.

Reference numeral 305 denotes a color processing circuit to execute necessary processes such as black extracting process, UCR process, masking process, and the like to the MCY image data supplied from the time base converting circuit in accordance with a color process control signal supplied from the control unit 312, thereby forming MCYK image data. In the embodiment as mentioned above, since the images are area sequentially formed in accordance with the order of MCYK, the color processing circuit 305 area sequentially selects the MCYK image data in accordance with the color process control signal supplied from the control unit 312 and generates the image signal $V_1$. Since the techniques regarding the black extracting process, UCR process, masking process, and the like are well-known techniques, their detailed descriptions are omitted here.

Reference numeral 306 denotes a gamma ($\gamma$) offset circuit for performing a gradation correction to the image signal $V_1$ supplied from the color processing circuit 305 in accordance with a gamma ($\gamma$) control signal supplied from the control unit 312 and generating the image signal $V_2$. The $\gamma$ offset circuit 306 executes the gradation correction by the following equation.

$$\left.\begin{array}{rcl} M_4 & = & e_1(M_3 - f_1) \\ C_4 & = & e_2(C_3 - f_2) \\ Y_4 & = & e_3(Y_3 - f_3) \\ K_4 & = & e_4(K_3 - f_4) \end{array}\right\} \quad (12)$$

In the equation (12), $M_3$, $C_3$, $Y_3$, and $K_3$ denote MCYK image data generated from the color processing circuit 305; $M_4$, $C_4$, $Y_4$, and $K_4$ indicate MCYK image data which are supplied from the $\gamma$ offset circuit 306; and $e_1$ to $e_4$ and $f_1$ to $f_4$ indicate coefficients which are determined by the $\gamma$ control signal which is supplied from the control unit 312.

Reference numeral 307 denotes a laser driver included in the foregoing laser scanner unit 16. The laser driver 307 modulates the semiconductor laser on the basis of a screen angle control signal supplied from the control unit 312 and the image signal $V_2$ supplied from the $\gamma$ offset circuit 306, thereby forming an image having light/dark expression.

Figure 8:
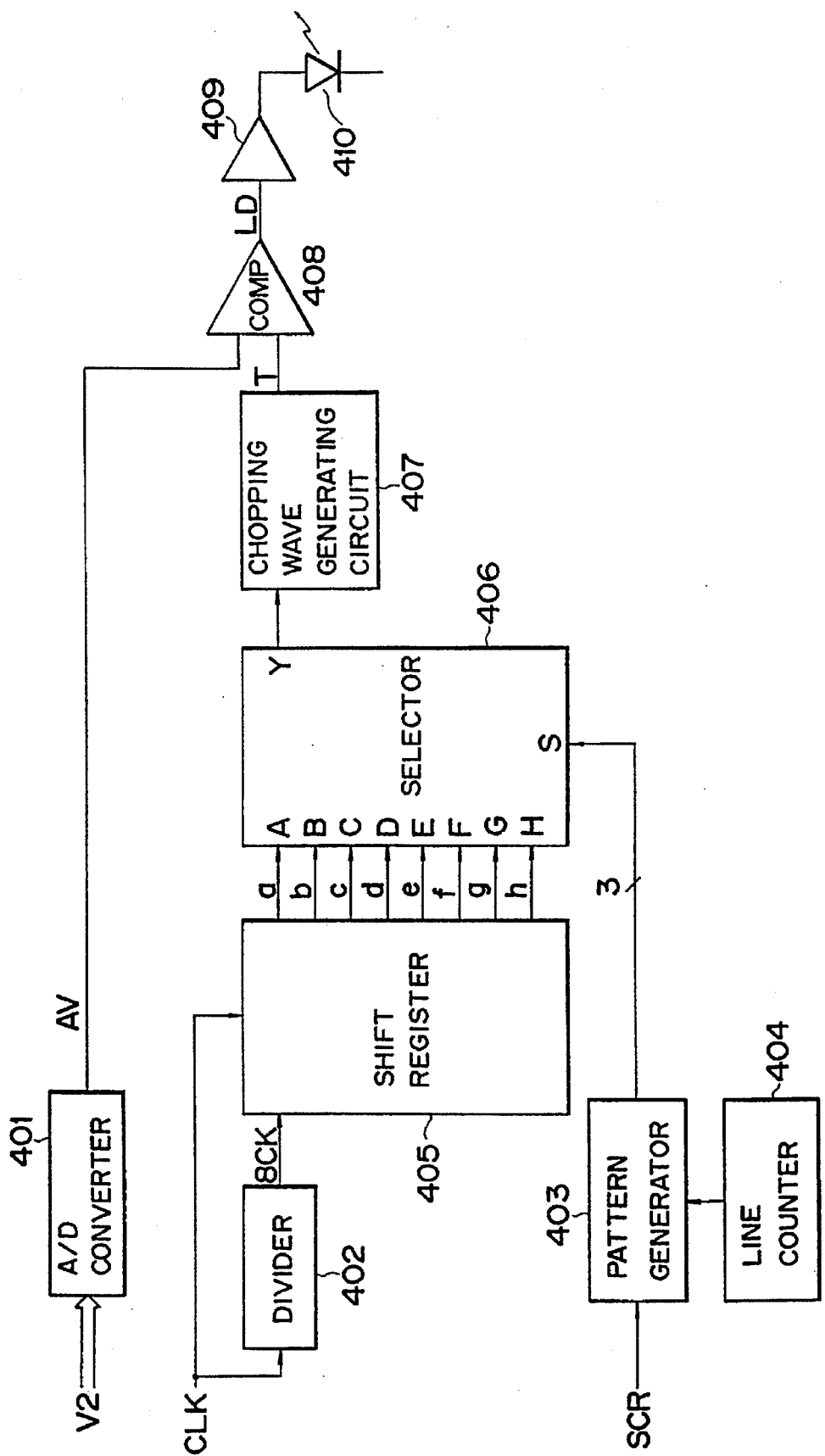
FIG. 8 is a block diagram showing an example of a construction of a PWM modulating circuit included in a laser driver of the embodiment.

FIG. 8 is a block diagram showing an example of a construction of a PWM modulating circuit included in the laser driver 307. FIG. 9 is a timing chart showing an example of the operation of the PWM modulating circuit.

In FIG. 8, reference numeral 401 denotes a D/A converter for converting the image signal $V_2$ supplied from the $\gamma$ offset circuit 306 into an analog image signal AV synchronously with an image clock VCLK as shown in FIG. 9.

Reference numeral 402 denotes a frequency divider for frequency dividing a clock CLK of a frequency that is four times as high as the frequency of the image clock VCLK into, for example, 1/8 and generating clocks 8CK.

Reference numeral 405 denotes a shift register for shifting the clocks 8CK supplied from the divider 402 synchronously with the clock CLK and generating, for example, eight clocks a to h. That is, as shown in FIG. 9, the shift register 405 generates, for instance, eight clocks a to h each of which is sequentially delayed by every period from the clock CLK.

Reference numeral 404 denotes a line counter to count the number of scanning times at which the laser beam scanned the photo sensitive drum 1 shown in FIG. 1.

Reference numeral 403 denotes a pattern generator for generating a phase change amount of, for example, three bits in accordance with the screen angle control signal supplied from the control unit 312 and a count value of the line counter 404.

Reference numeral 406 denotes a selector for selecting either one of the clocks a to h supplied from the shift register 405 in accordance with the phase change amount sent from the pattern generator 403 to a selection input terminal S and generating the selected clock as a screen clock. That is, as shown in an example in FIG. 10, the laser driver 307 can select, for example, eight screen angles by the selector 406.

Reference numeral 407 denotes a chopping wave generating circuit for generating a chopping wave T synchronized with the screen clock (clock h is selected in FIG. 9) supplied from the selector 406 as shown in FIG. 9.

Reference numeral 408 denotes a comparator for comparing the level of the analog image signal AV supplied from the D/A converter 401 and the level of the chopping wave T generated from the chopping wave generating circuit 407 and generates the result of the comparison as a signal LD. The comparator 408 generates the signal LD="1" when AV>T. The comparator 408 generates the signal LD="0" when AV≦T.

Reference numeral 409 denotes a constant current driver to constant current drive a laser diode 410 in accordance with the signal LD supplied from the comparator 408. For example, when the signal LD="1", the constant current driver 409 allows the laser diode 410 to emit the light. When the signal LD="0", the driver 409 stops the light emission of the laser diode.

That is, when the laser driver 307 allows the laser diode 410 to emit the light for a period of time during which the level of the analog image signal AV is higher than that of the chopping wave T. Since the level of the analog image signal AV indicates a density of image which is formed, as the portion has a high density, the light emitting time of the laser is long and an image having light/dark expression can be formed.

It is generally known that when the screen angle is changed, the coupling state among the toners constructing the devloped dots changes, so that the density can be finely adjusted. As mentioned above, since the laser driver 307 can select, for example, eight kinds of screen angles by the selector 406, the density of each color is finely adjusted to, for instance, eight levels and a hue of the image which is formed can be finely adjusted.

When the copy start is instructed after the operator selected a two-sided output mode by the operation unit 313, the image scanner unit 201 starts the reading of the original image at the first time. The printer unit 202 feeds the recording paper P and starts the printing to the A side.

In this instance, as mentioned above, the control unit 312 sends the control signals of the time base, color process, γ, and the like to predetermined blocks and sets the proper parameters into the blocks, respectively.

As mentioned above, the control unit 312 allows the color processing circuit 305 to select the M image data corresponding to the first time by the color process control signal and supplies the M image data to the γ offset circuit 306.

The control unit 312 allows the laser driver 307 to select the screen angle of, for example, 45° shown as an example in FIG. 10 by a screen angle control signal. Namely, the control unit 312 allows the laser driver 307 to select the screen angle of, for example, 45° in FIG. 10 in order to set the density of M toner which is recorded to the A side to be lower than the standard density in consideration of the heat energy that is applied to the M toner when the B side is printed later.

After completion of the recording at the first time, the control unit 312 sequentially executes the recording from the second to fourth times in a manner similar to the case of the first time. The control unit 312, however, allows the color processing circuit 305 to select the C image data at the second time, the Y image data at the third time, and the K image data at the fourth time, The control unit 312 also allows the laser driver 307 to select the screen angle of, for example, 0° in FIG. 10 at the second to fourth times.

After completion of the printing to the A side, the control unit 312 executes the printing to the B side in a manner similar to the case of the A side. Upon recording to the B side, however, for example, the control unit 312 allows the laser driver 307 to select the screen angle of, for example, 0° in FIG. 10 at the first to fourth times.

According to the embodiment as described above, by changing the screen angle of the laser driver 307 in accordance with the printing surface and the toner color, a difference of the hues between the image printed on the A side and the image printed on the B side which occurs due to a difference of the color generations of the same color toner due to an unevenness of the heat energy can be reduced. An image of an almost uniform hue with respect to the A side and B side can be formed.

[Twelfth embodiment]

The twelfth embodiment according to the invention will now be described hereinbelow. In the twelfth embodiment, the portions similar to those in the eleventh embodiment are designated by the same reference numerals and their detailed descriptions are omitted here.

In the eleventh embodiment, the hue has been uniformed by changing the screen angle in accordance with the A side or B side in the laser driver 307 having a construction such that the gradation of recording dots is formed by using the PWM modulation. In the twelfth embodiment, however, explanation will now be made with respect to an example in which the hue is uniformed by changing a dither pattern in accordance with the A side or B side in the laser driver 307 having a construction such that the gradation of recording dots is formed by using a dither method.

Figure 11:
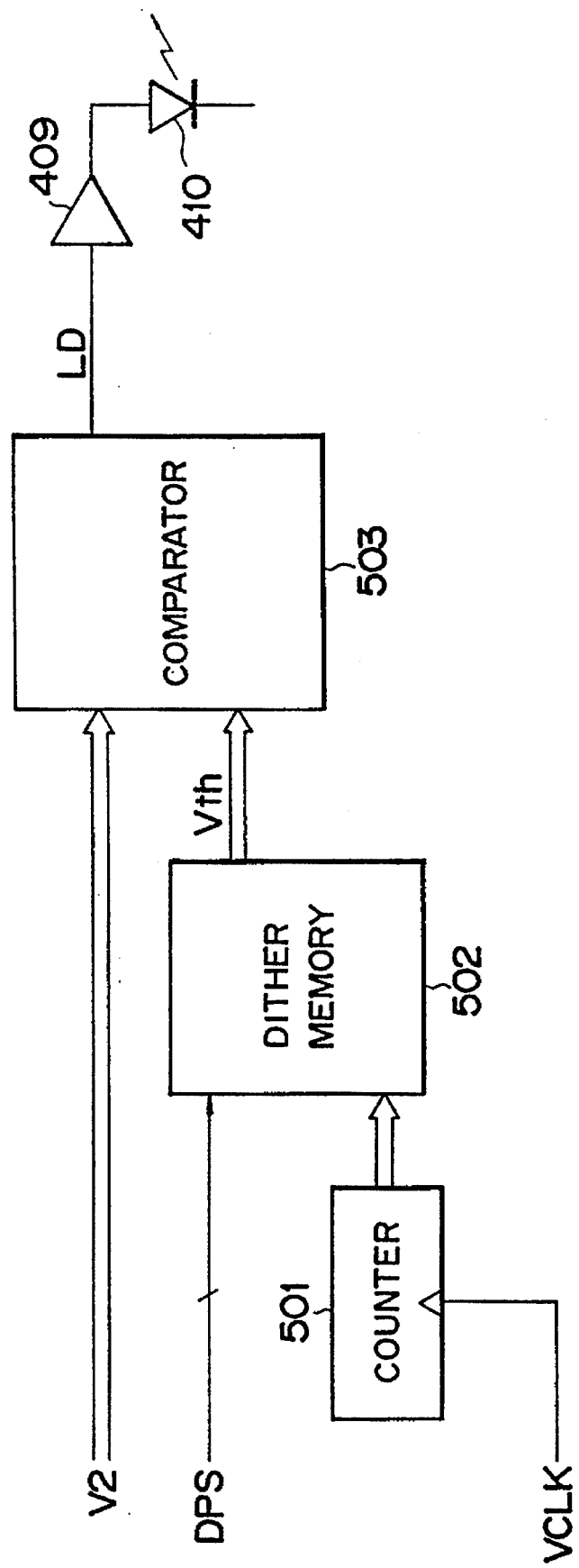
FIG. 11 is a block diagram showing an example of a construction of a part of a laser driver of an image forming apparatus of the twelfth embodiment of the invention.

FIG. 11 is a block diagram showing an example of a construction of a part of the laser driver 307 in an image forming apparatus of the twelfth embodiment according to the invention.

In FIG. 11, reference numeral 501 denotes a counter to count the number of image clocks VCLK or the like.

Reference numeral 502 denotes a dither memory which is constructed by, for example, an RAM or the like. The dither memory 502 stores well-known dither patterns by a control signal DPS which is supplied from the control unit 312 and generates a stored dither threshold value $V_{th}$ in accordance with a count value of the counter 501.

Reference numeral 503 denotes a comparator for comparing the image signal $V_2$ which is supplied from the γ offset circuit 306 shown in FIG. 8 and the dither threshold value $V_{th}$ read out from the dither memory 502 and generates the result of the comparison as a signal LD. The comparator 503 generates the signal LD="1" when $V_2>V_{th}$. The comparator 503 generates the signal LD="0" when $V_2 \leq V_{th}$.

The signal LD is sent to the constant current driver 409, thereby allowing the laser diode 410 to emit the light in a manner similar to the case of the PWM modulating circuit shown as an example in FIG. 8. The constant current driver 409, for example, allows the laser diode 410 to emit the light when the signal LD="1" and stops the light emission when the signal LD="0".

That is, the laser driver 307 allows the laser diode 410 to emit the light for a period of time during which the value of the image signal $V_2$ is larger than the dither threshold value $V_{th}$. Since the value of the image signal $V_2$ indicates a density of an image which is formed, the light emitting time of the laser beam is long in the portion of a high density and an image having light/dark expression can be formed. Therefore, by changing the dither pattern, the coupling state among the toners constructing the developed dots changes, the density can be finely adjusted. In the embodiment, the hue of an image which is formed can be finely adjusted by finely adjusted the density of each color, respectively.

According to the embodiment as described above, for example, by changing the dither pattern in accordance with, for example, the recording mode of the M toner of the A side and the recording mode of another toner of the A side and the recording mode of the B side, a difference of the hues between the image printed on the A side and the image printed on the B side which occurs due to a difference of the color generation of the same color toner due to an unevenness of the heat energy can be reduced. An image of an almost equal hue with respect to the A side and B side can be formed.

[Thirteenth embodiment]

The thirteenth embodiment according to the invention will now be described hereinbelow. In the 13th embodiment, the portions similar to those in the first, fourth, and eleventh embodiments are designated by the same reference numerals and their detailed descriptions are omitted here.

When the copy start is instructed after the operator selected a two-sided output mode or the like by the operation unit 313, the image scanner unit 201 starts the reading of the original image at the first time and the printer unit 202 feeds the recording paper P and starts the printing to the A side.

In this instance, as mentioned above, the control unit 312 sends the control signals of the time base, color process, γ, and the like to predetermined blocks and sets the proper parameters into the blocks, respectively.

As mentioned above, the control unit 312 allows the color processing circuit 305 to select the M image data corresponding to the first time by the color process control signal and supplies the M image data to the γ offset circuit 306.

The control unit 312 allows the laser driver 307 to select the screen angle of, for example, 45° shown as an example in FIG. 10 by the screen angle control signal. That is, the control unit 312 allows the laser driver 307 to select the screen angle of, for example, 45° in FIG. 10 in order to set the density of M toner which is recorded to the A side to be lower than the standard density in consideration of the heat energy that is applied to the M toner when the B side is printed later. When the one-side output mode is selected, the control unit 312 allows the laser driver 307 to select the screen angle of, for example, 26° in FIG. 10 in order to set the density of M toner which is recorded to the A side to the standard density.

After completion of the recording at the first time, the control unit 312 sequentially executes the recording at the second to fourth times in a manner similar to the case of the first time. The control unit 312, however, allows the color processing circuit 305 to select the C image data at the second time, the Y image data at the third time, and the K image data at the fourth time. The control unit 312 also allows the laser driver 307 to select the screen angle of, for example, 26° in FIG. 10 at the second to fourth times.

After completion of the printing to the A side, the control unit executes the printing to the B side in a manner similar to the case of the A side. The control unit 312, however, allows the laser driver 307 to select the screen angle of, for example, 0° in FIG. 10 at the first to fourth times when the B side is recorded in order to set the density of each toner which is recorded to the B side to be higher than the standard density in consideration of the fact that the fibers of the recording paper P have already been crushed by the pressure applied upon recording to the A side.

According to the embodiment as described above, by changing the screen angle of the laser driver 307 in accordance with the printing surface and the toner color, a difference of the hues between the image printed on the A side and the image printed on the B side which occurs due to a difference of the color generations of the same color toner due to the unevenness of the heat energy and the career of the pressure applied to the recording paper P can be reduced. An image of an almost uniform hue with respect to the A side and B side can be formed.

According to the embodiment, further, since the screen angle of the laser driver 307 is changed in accordance with the two-sided output mode or one-sided output mode, a difference of the hues in the case where the same image was printed to one side and in the case where the same image was printed to two sides can be reduced. An image of an almost uniform hue can be formed irrespective of the output mode such as two-sided output mode or one-sided output mode.

[Fourteenth embodiment]

The fourteenth embodiment according to the invention will now be described hereinbelow. In the 14th embodiment, the portions similar to those in the first, fourth, eighth, and eleventh embodiments are designated by the same reference numerals and their detailed descriptions are omitted.

According to the 14th embodiment, a screen angle of the laser driver 307 is set in consideration of a point that in case of printing to a recording paper which is thicker than the standard thickness, the heat energy which is subjected to the A side upon recording to the B side is smaller as compared with that in case of the standard recording paper.

When the copy start is instructed after the operator selected a two-sided output mode or the like by the operation unit 313, the image scanner unit 201 starts the reading of the original image at the first time and the printer unit 202 feeds the recording paper P and starts the printing to the A side.

In this instance, as mentioned above, the control unit 312 sends the control signals of the time base, color process, γ, and the like to predetermined blocks and sets the proper parameters into the blocks, respectively.

As mentioned above, the control unit 312 allows the color processing circuit 305 to select the M image data corresponding to the first time by the color process control signal and supplies the M image data to the γ offset circuit 306.

The control unit 312 allows the laser driver 307 to select the screen angle of, for example, 45° shown as an example in FIG. 10 by the screen angle control signal. That is, the control unit 312 allows the laser driver 307 to select the screen angle of, for example, 45° in FIG. 10 in order to set the density of M toner which is recorded to the A side to be lower than the standard density in consideration of the heat energy that is applied to the M toner when the B side is printed later. When the "thick paper mode" is selected by the operation unit 313 shown in FIG. 5, however, the control unit 312 allows the laser driver 307 to select the screen angle of, for example, 26° in FIG. 10 in order to set the density of M toner which is recorded to the A side to be slightly lower than the standard density.

After completion of the recording at the first time, the control unit 312 sequentially executes the recording at the second to fourth times in a manner similar to the case at the first time. The control unit 312, however, allows the color processing circuit 205 to select the C image data at the second time, the Y image data at the third time, and the K image data at the fourth time. The control unit 312 also allows the laser driver 307 to select the screen angle of, for example, 0° in FIG. 10 at the second to fourth times.

After completion of the printing to the A side, the control unit 312 executes the printing to the B side in a manner similar to the case of the A side. The control unit 312, however, allows the laser driver 307 to select the screen angle of, for example, 0° in FIG. 10, for instance, at the first to fourth times upon recording to the B side.

Although the embodiment has been described above with respect to the example in which the operator sets the "thick paper mode" by the operation unit 313, the invention is not limited to such an example. The invention can be also applied to another method whereby, for example, whether a recording paper to be printed as a thick paper or not is discriminated by using the sheet cassette 601 shown in FIG. 6 or whereby a thickness of recording paper is automatically detected by a recording paper thickness sensor provided in the apparatus main body.

According to the embodiment as described above, by changing the screen angle of the laser driver 307 in accordance with the printing surface and the toner color, a difference of the hues between the image printed on the A side and the image printed on the B side which occurs due to a difference between the color generations of the same color toner due to an unevenness of the heat energy can be reduced. An image of an almost uniform hue with respect to the A side and B side can be formed.

According to the embodiment, further, in the case where the "thick paper mode" has been set and the M toner is recorded to the A side, by changing the screen angle that is selected by the laser driver 307, a density of M toner which is recorded to the A side is set to be slightly higher than the density in case of recording to the recording paper of the standard thickness. Therefore, a difference of the hues in the case where the same image was printed to two sides of the recording paper of the standard thickness and in the case where the same image was printed to two sides of a recording paper which is thicker than the standard paper can be reduced. An image of an almost equal hue can be formed.

The processes in the "thick paper mode" can be also applied to an apparatus for recording an image to only one side as well as the apparatus for recording to two sides.

The invention can be applied to a system comprising a plurality of apparatuses or can be also applied to a system comprising one apparatus.

The invention can be also applied to the case where it is accomplished by supplying programs to a system or an apparatus.

The invention is not limited to an electrophotographic printer but can be also applied to an ink jet printer, a thermal jet printer, a thermal printer, or the like.

According to the invention as mentioned above, an image forming apparatus to form images to two sides of front and back surfaces of a recording medium in accordance with the surface of the recording medium onto which an image should be formed can be provided.

What is claimed is:

1. A color image processing apparatus comprising:

setting means for setting one of a single side mode and a two side mode as an image forming mode;

color processing means for color processing color image data on the basis of the image forming mode set by said setting means to produce color processed color image data; and output means for outputting the color processed color image data to a color image forming unit.

2. An apparatus according to claim 1, wherein the color image forming unit has a two side unit, and wherein when the two side mode is set, color images are formed on front and back surfaces of a recording medium by using the two side unit.

3. An apparatus according to claim 1, wherein said color processing means performs color processing based on the image forming mode set by said setting means, a surface on which an image is to be printed, and a color component being printed.

4. An apparatus according to claim 3, wherein said color processing means performs gradation correction processing.

5. An apparatus according to claim 3, wherein said color processing means performs masking processing.

6. An apparatus according to claim 3, wherein said color processing means performs undercolor removal processing.

7. An apparatus according to claim 1, wherein the single side mode includes a mode for generating two single-sided outputs from a two-sided original, and wherein the two side mode includes a mode for generating two-sided outputs from two single-sided originals.

8. An apparatus according to claim 1, wherein said setting means sets the image forming mode on the basis of an instruction manually input by a user.

9. An apparatus according to claim 1, wherein said setting means is capable of setting a thick paper mode as the image forming mode in addition to one of the single side mode and the two side mode.

10. An apparatus according to claim 1, wherein said color processing means performs color processing for color image data based on whether a color image is to be formed from the color image data on a front or a back surface of a recording sheet.

11. A color image processing method comprising the steps of:

setting one of a single side mode and a two side mode as an image forming mode;

color processing color image data on the basis of the image forming mode set in said setting step to produce color processed color image data; and outputting the color processed color image data to a color image forming unit.

* * * * *